US011171886B2

(12) United States Patent
Kowalik (10) Patent No.: US 11,171,886 B2
(45) Date of Patent: Nov. 9, 2021

(54) NON-BLOCKING SWITCH MATRIX

(71) Applicant: Keysight Technologies, Inc., Santa Rosa, CA (US)

(72) Inventor: Jason Kowalik, Thornton, CO (US)

(73) Assignee: Keysight Technologies, Inc., Santa Rosa, CA (US)

( * ) Notice: Subject to any disclaimer, the term of this patent is extended or adjusted under 35 U.S.C. 154(b) by 49 days.

(21) Appl. No.: 16/666,468

(22) Filed: Oct. 29, 2019

(65) Prior Publication Data

US 2021/0126876 A1  Apr. 29, 2021

(51) Int. Cl.
*H04L 12/931* (2013.01)
*H04L 12/933* (2013.01)

(52) U.S. Cl.
CPC .......... *H04L 49/45* (2013.01); *H04L 49/1515* (2013.01)

(58) Field of Classification Search
CPC ....................... H04L 49/00; H04L 49/10–1592
See application file for complete search history.

(56) References Cited

U.S. PATENT DOCUMENTS

| 6,970,458 | B1 | 11/2005 | Lim | |
|---|---|---|---|---|
| 7,310,333 | B1 | 12/2007 | Conklin et al. | |
| 7,675,909 | B2 | 3/2010 | Ryan et al. | |
| 7,881,568 | B2 | 2/2011 | Lin | |
| 2002/0171451 | A1* | 11/2002 | Hamano | ............. H04L 49/1576 326/41 |
| 2008/0192727 | A1* | 8/2008 | Pesusich | ................. H04L 49/00 370/351 |
| 2013/0271236 | A1* | 10/2013 | Baldor | ................ H04L 49/1515 333/101 |
| 2018/0062971 | A1* | 3/2018 | Kyosti | .................... H04L 43/50 |

* cited by examiner

*Primary Examiner* — Chi H Pham
*Assistant Examiner* — Vladislav Y Agureyev (57) ABSTRACT

A N×M non-blocking switch matrix, where N and M are integers, includes an input stage having a plurality of m/2-way multiport switches, where quotient m/2 is a positive integer less than M, and an output stage having a plurality of n/2-way multiport switches, where quotient n/2 is a positive integer less than N. The switch matrix further includes a transfer stage having a plurality of transfer switches operatively connected between the input stage and output stage, and selectively applying outputs of the m/2-way multiport switches to inputs of the n/2-way multiport switches such that any given input to the m/2-way multiport switches is connectable to any given output of the n/2-way multiport switches.

20 Claims, 9 Drawing Sheets

NON-BLOCKING SWITCH MATRIX

BACKGROUND

Multiport switches find use in a large number of applications, including test and measurement, signal monitoring, and routing applications. The simplest multiport signal routing scheme takes the form of a single input to multiple outputs. These multiport switches (or matrixes) may, as an example, be used on the front of an analyzer to test several two-port devices sequentially. Full access switching systems, on the other hand, provide the flexibility to route multiple input signals to multiple outputs simultaneously. For example, full access switching matrixes may be used in test systems to provide flexible routing of signals to and from many different devices under test (DUTs) and test instrumentation.

Figure 1:
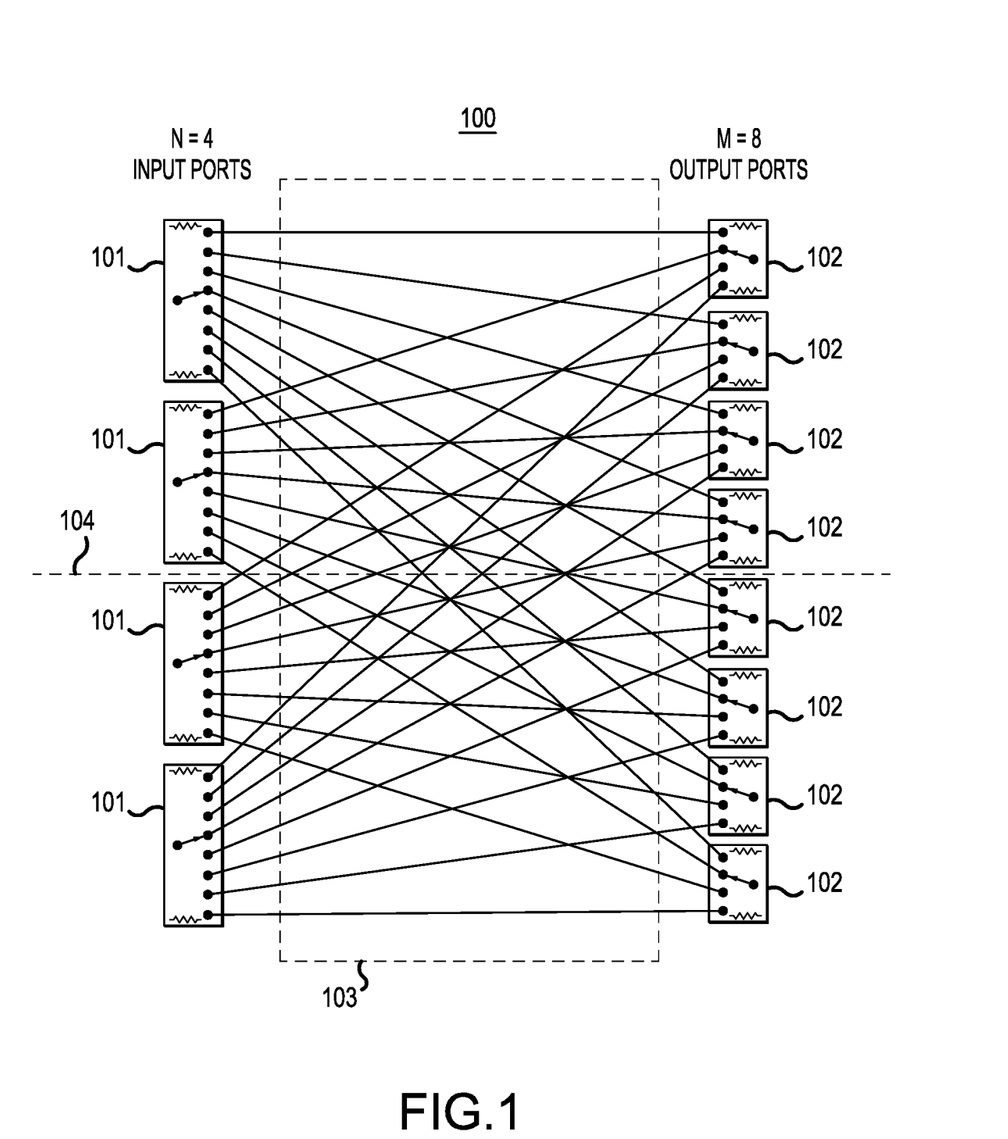
FIG. 1 is a schematic diagram of a conventional non-blocking switch matrix.

In conventional nomenclature, a full access or "non-blocking" switch matrix is described as having N input ports and M output ports, where N and M are integers of one or more, and where any one of the N input ports can be connected to any one of the v output ports. An example in which there are four input ports (N is 4) and eight output ports (M is 8) is illustrated in the schematic diagram of FIG. 1. As shown, the non-blocking switch 100 includes four 1×M-way multiport switches 101 on the input (left) side, and eight 1×N-way multiport switches 102 on the output (right) side. Each of the 1×M-way multiport switches 101 on the input side is responsive to control circuitry (not shown) to apply a signal present at its input port to any one of M (8) output ports. Likewise, each of the 1×N-way multiport switches 102 is responsive to control circuitry to apply a signal present at any of N (4) input ports to its output port. Point-to-point connections 103 are provided between the output ports of the 1×M-way multiport switches 101 and the input ports of the 1×N-way multiport switches 102. More specifically, as in the example of FIG. 1, a point-to-point connection is provided between the eight output ports of each 1×M-way multiport switch 101 to a respective input port of each of the eight 1×N-way multiport switches 102.

In RF (radio frequency) applications, coaxial cables may be used to connect the outputs of the multiport switches on the input side to the inputs of the multiple port switches on the output side. In a traditional switch matrix, N*M coaxial cables are used for this purpose. For example, in the switch matrix of FIG. 1, 4×8=32 coaxial cables are needed to achieve a non-blocking switch matrix in which any one of the N input ports of the multipoint switches 101 can be connected to any one of the M output ports of the multipoint switches 102.

The traditional technique for obtaining a switch matrix with non-blocking characteristics becomes problematic for dimensions of N or M beyond about 6 or 8. In particular, the resultant higher switch port counts (way-number) of each multiport switch come with severe performance tradeoffs (e.g., lower maximum RF frequency, and poorer loss performance. VSWR (voltage standing wave ratio) and isolation characteristics).

Also, the additional space needed to accommodate the interior connections can be prohibitive when expanding the dimensions of N and M. In particular, the additional space needed does not easily partition in multiple chassis. Assume, for example, that the dashed line 104 of FIG. 1 denotes a demarcation between two chassis. Namely, one chassis is located above the line 104 and the other is located below the line 104. To implement the 4×8 non-blocking switch matrix of FIG. 1, sixteen of the coaxial cables would be routed between chassis. In other words, half of total number of coaxial cables would extend between chassis. This can become difficult as the number of input and/or output ports is increased in a non-blocking switch matrix. For example, in the case of a 12×12 non-blocking switching matrix, it would be necessary to route 72 coaxial cables between the two chassis.

Accordingly, there is a need for non-blocking switch matrix which allows for an increase in input/output port dimensions without suffering severe performance degradation, while also minimizing the number of cables extending between chassis housing the switching equipment.

SUMMARY

According to one aspect of the disclosed embodiments, a N×M non-blocking switch matrix is provided, wherein N and M are integers. The switch matrix includes an input stage having a plurality of m/2-way multiport switches, where quotient m/2 is a positive integer less than M, and an output stage having a plurality of n/2-way multiport switches, where quotient n/2 is a positive integer less than N. The switch matrix further includes a transfer stage having a plurality of transfer switches operatively connected between the input stage and output stage, and selectively applying outputs of the m/2-way multiport switches to inputs of the n/2-way multiport switches such that any given input to the m/2-way multiport switches is connectable to any given output of the n/2-way multiport switches.

According to another aspect of the disclosed embodiments, a N×M non-blocking switch matrix is provided, where N and M are integers. The switch matrix includes N/2 pairs of m/2-way multiport switches, where quotient m/2 is an integer greater than or equal to M/2 and less than M, and each m/2-way multiport switch including an input port and m/2 output ports. The switch matrix further includes N/2 sets of transfer switches operatively connected to the N/2 pairs of m/2-way multiport switches, respectively. Each set of transfer switches includes M/2 transfer switches, and each transfer switch includes first and second input ports and first and second output ports, where the first input port of each transfer switch is connected to an output port of one m/2-way multiport switch among a respective pair of m/2-way multiport switches, and the second input port of each transfer switch is connected to an output port of another m/2-way multiport switch among a respective pair of m/2-way multiport switches. The switch matrix further includes M/2 pairs of n/2-way multiport switches, where quotient n/2 is an integer greater than or equal to N/2 and less than N. Each n/2-way multiport switch includes an output port and n/2 input ports, wherein the input ports of each n/2-way multiport switch are connected to an output port from among the respective N/2 sets of transfer switches.

According to yet another aspect of the disclosed embodiments, an N×M non-blocking switch matrix is provided, where N and M are positive integers of at least six. The switch matrix includes input multiport switches each having an input port and a number of output ports which is less than M, output multiport switches each having an output port and a number of input ports which is less than N, and a plurality of transfer switches operatively connected between the input multiport switches and the output multiport switches such that any given input port among the input multiport switches is connectable to any given output port among the output multiport switches.

BRIEF DESCRIPTION OF THE DRAWINGS

The illustrative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings. Generally, it is understood that the drawings and the various elements depicted therein are not drawn to scale.

Generally, it is understood that as used in the specification and appended claims, the terms "a", "an" and "the" include both singular and plural referents, unless the context clearly dictates otherwise. Thus, for example, "a device" includes one device and plural devices.

As used in the specification and appended claims, and in addition to their ordinary meanings, the terms "substantial" or "substantially" mean to within acceptable limits or degree. For example, "substantially cancelled" means that one skilled in the art would consider the cancellation to be acceptable. As a further example, "substantially removed" means that one skilled in the art would consider the removal to be acceptable. As used in the specification and the appended claims and in addition to its ordinary meaning, the term "approximately" means to within an acceptable limit or amount to one having ordinary skill in the art. For example, "approximately the same" means that one of ordinary skill in the art would consider the items being compared to be the same.

Figure 2:
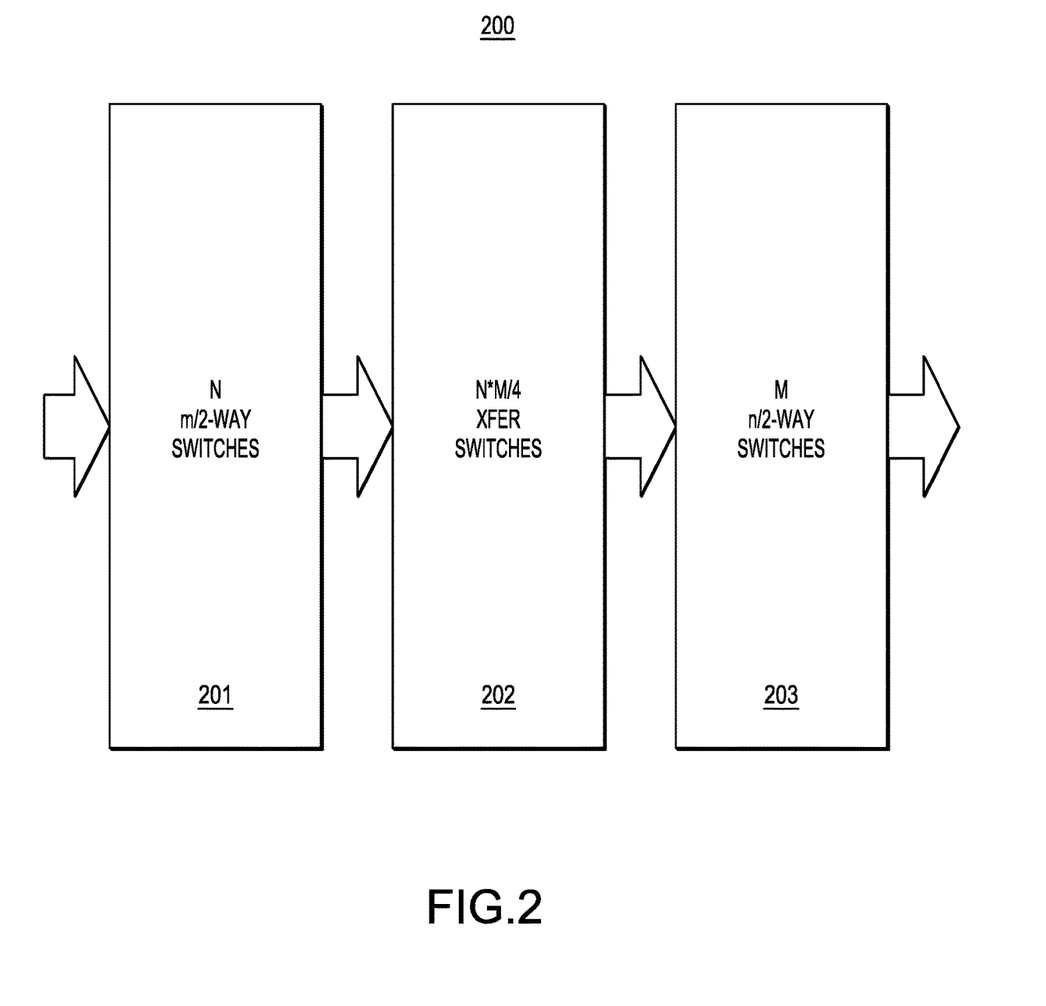
FIG. 2 is a block diagram of a non-blocking switch matrix according to a representative embodiment.

FIG. 2 is a block diagram of a non-blocking switch matrix 200 according to a representative embodiment. The non-blocking switch matrix 200 includes an input stage 201, a transfer stage 202, and an output stage 203. As suggested by the arrows, signal propagation is from left to right in FIG. 2.

As described previously, the traditional N×M non-blocking switch matrix is made up of N input ports each configured of an M-way multiport switch, and M output ports each configured of an N-way multiport switch. In contrast, the representative embodiments as depicted in FIG. 2 are characterized by the provision of smaller dimensioned m/2-way and n/2-way multiport switches at the input and output stages 201 and 203, respectively, with the addition of high performance transfer switches to the interior of the switch fabric at the transfer stage 202. That is, the same number (N and M) of multiport switches as in the traditional technique are utilized, but the switch dimensions (i.e., number of ways) of each multiport switch is reduced by up to half. Especially as N and M exceed 8 or more, smaller dimensioned multiport switches exhibit far superior performance characteristics, particularly in terms of maximum RF frequency. Although the inventive concepts are not limited to the specific examples shown, the table below shows some typical performance characteristics of multiport switches of different sizes.

| Size | Max RF Freq. (GHz) | Max VSWR (at 18 GHz) | Max Insertion Loss (at 18 GHz) | Min Isolation (dB at 18 GHz) |
|---|---|---|---|---|
| 6-way | 50 | 1.5 | 0.5 | 60 |
| 8-way | 26.5 | 1.6 | 0.6 | 60 |
| 10-way | 22 | 1.7 | 0.7 | 55 |
| 12-way | 18 | 1.8 | 0.8 | 50 |

As can be seen the examples above, the maximum RF frequency of a 6-way multiport switch may be up to 50 GHz, whereas the maximum RF frequency of a 12-way multiport switch may be on the order of 18 GHz.

Further, as will be seen in the examples that follow, the total number of connections (e.g., coaxial cables) remains the same as compared to the tradition techniques, but the number of connections extending from one chassis to another may be reduced.

To compensate for the reduced switching capacity of the smaller dimensioned multiport switches, the transfer stage 202 is provided and equipped with high performance transfer switches. As will be evident from the examples that follow herein, the number of transfer switches may be equal to the one-fourth the product of N and M. For example, for an 8×8 non-blocking switch matrix, sixteen (8×8/4) transfer switches would be provisioned in the transfer stage 202 between the input and output stages 201 and 203.

Still referring to FIG. 2, the input stage 201 includes a plurality (N) of m/2-way multiport switches. As will be better understood from the examples that follow herein, quotient m/2 is an integer that is greater than or equal to M/2, and less than M. For example, where M=8, the quotient m/2 may be as low at 4, and as high as 7. (In the example that follows in FIG. 3, M=8 and m/2=6.)

Likewise, the output stage 203 includes a plurality (M) of n/2-way multiport switches. Herein, the quotient n/2 is an integer greater than or equal to N/2, and less than N. For example, where N=8, n/2 can be as low as 4, and as high as 7. (In the example that follows in FIG. 3, N=8 and n/2=6.)

As previously mentioned, the transfer stage includes a plurality (N×M/4) of transfer switches operatively connected between the input stage and output stage. As will become apparent from the examples that follow herein, the transfer switches are configured to selectively apply outputs of the multiport switches of the input stage 201 to inputs of the multiport switches of the output stage 203. In particular, each of the transfer switches may include first and second inputs coupled to the input stage, and first and second outputs coupled to the output stage. The configuration is such that any given input to the multiport switches of the input stage 201 is connectable to by the transfer switches of the transfer stage 202 to any given output of the multiport switches of the output stage 203. Coaxial cables may be used for connections between the input stage 201 and the transfer stage 202, and between the transfer stage 202 and the output stage 203.

Figure 3:
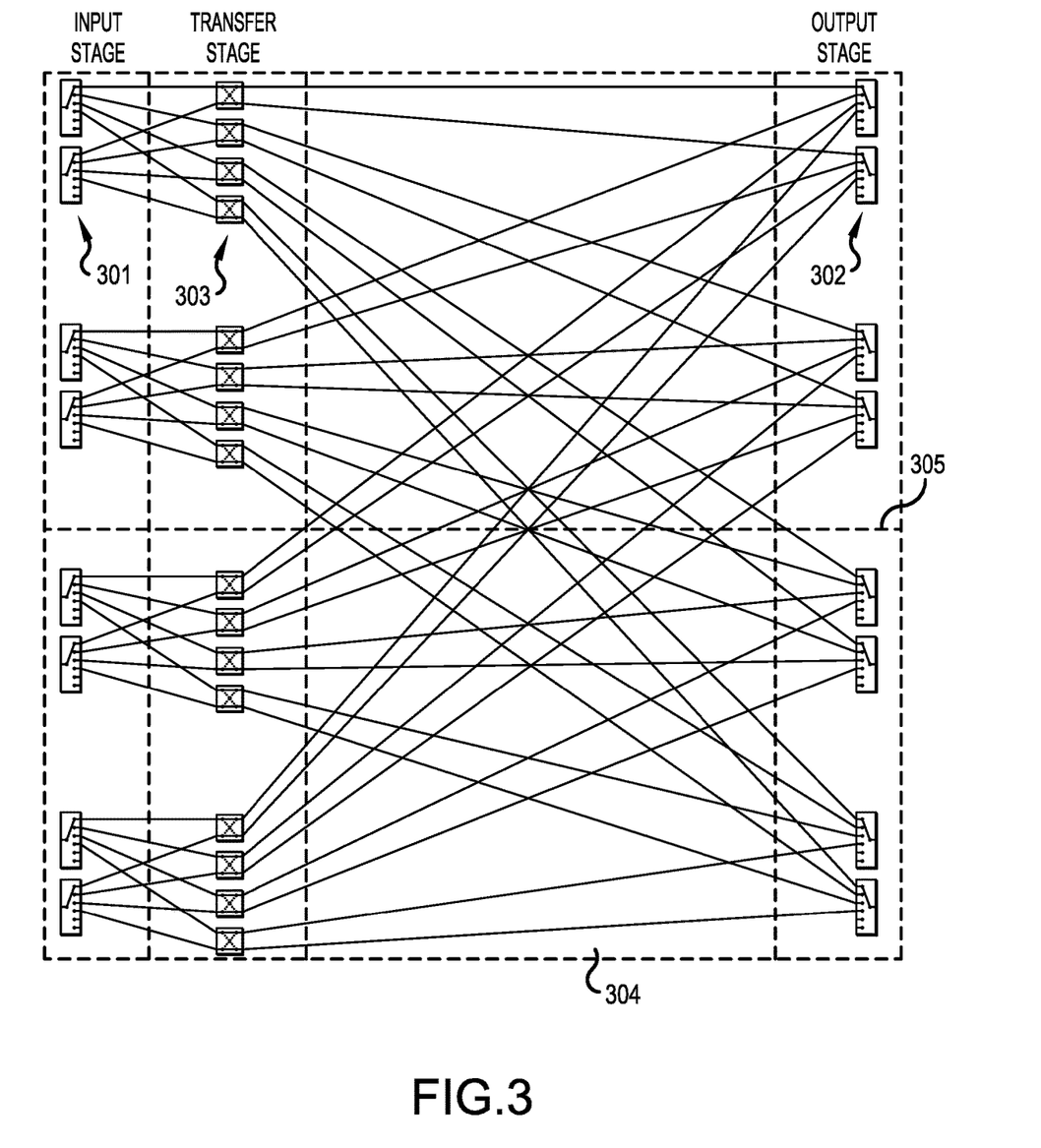
FIG. 3 is a schematic diagram of a non-blocking switch matrix according to a representative embodiment.

Attention is directed to FIG. 3 which illustrates an example of an 8×8 non-blocking switch matrix according to representative embodiments. Here, an input stage includes eight input ports, each configured by a 6-way multiport switch 301. An output stage is made up of eight output ports, each also configured by a 6-way multiport switch 302. In this example, only four of the six ways of each multipoint switch 301 and 302 are utilized. By way of comparison, the traditional 8×8 non-blocking switch matrix 100 of previously described FIG. 1 utilizes all the ways of 8-way multiport switches.

The multipoint switches 301 are grouped in pairs for purposes of explanation. In particular, in the case where there are N input ports, there are N/2 pairs of multiport switches in the input stage. As such, in the example of FIG. 3 having eight input ports, there are four (8/2) pairs of the 6-way multipoint switches 301. In addition, there are N/2 sets of transfer switches 303 in the transfer stage corresponding to the N/2 pairs of multiport switches of the input stage. In other words, for each pair of multipoint switches 301 there is a corresponding set of transfer switches 303. In the example of FIG. 3, there are four (8/2) sets of transfer switches 303 respectively corresponding to the four pairs of multiport switches 301.

Each set of transfer switches 303 includes M/2 transfer switches. As such, in the example of FIG. 3 having eight (M=8) output ports, each set of transfer switches 303 includes four (8/2) transfer switches 303. (By way of comparison, in the example described later in connection with FIGS. 8A and 8B, M=12 and hence there are six (12/2) transfer switches in each set of transfer switches.)

Figure 4:
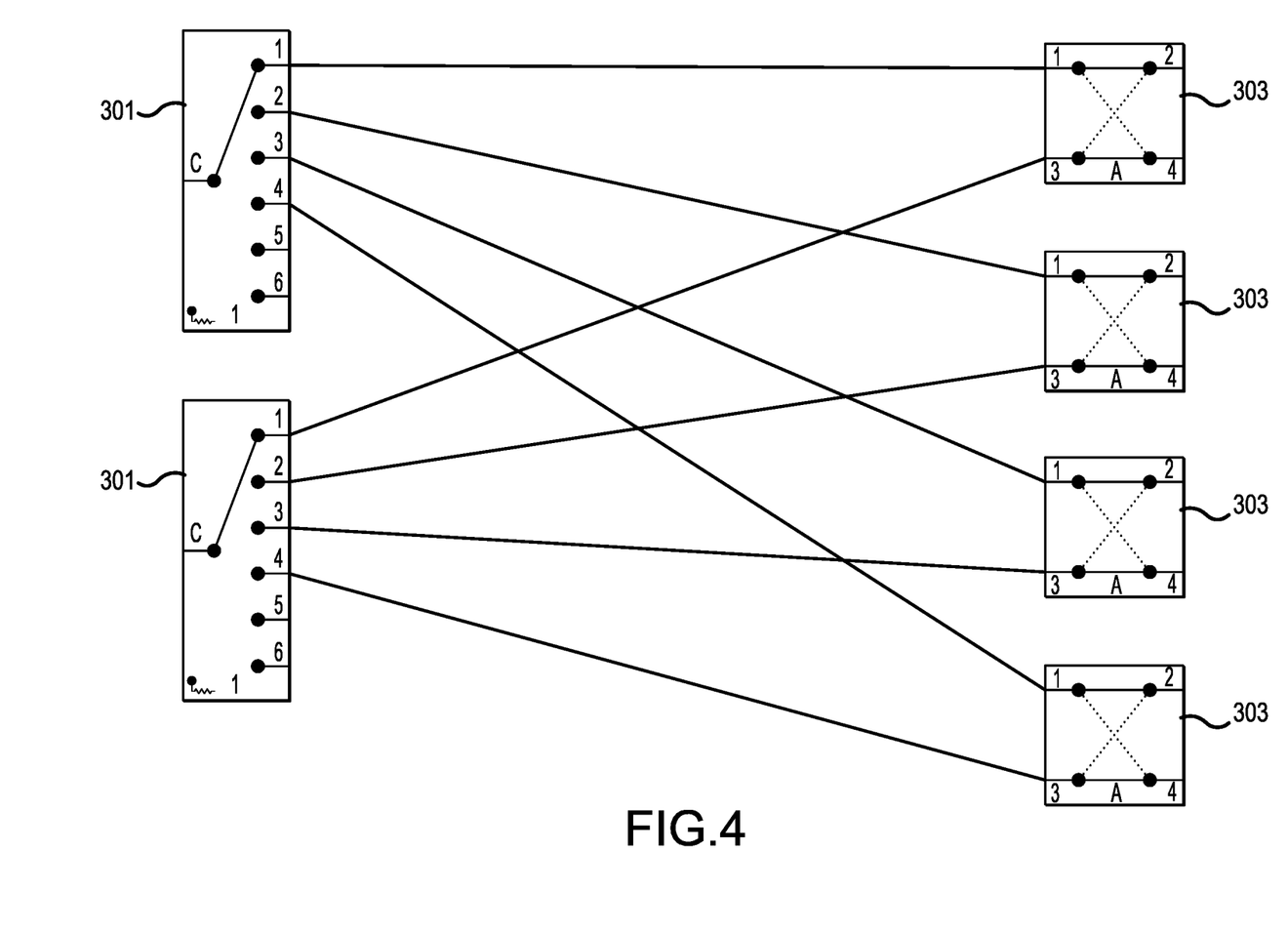
FIG. 4 illustrates a portion of the non-blocking switch matrix of FIG. 3.

Attention is now directed to FIG. 4 which shows the connection between one pair of multiport switches 301 of FIG. 3 to on set of transfer switches 303 of FIG. 3. Each transfer switch 303 includes first and second input terminals (1 and 3) and first and second output terminals (2 and 4), and in operation either input is connectable to either output. As shown, a first input terminal (1) of each transfer switch 303 is connected to respective output ports of one of the pair of multiport switches, and a second input terminal (3) of each transfer switch 303 is connected to the other of the pair of multipoint switches.

In the configuration of FIG. 4, an input port C of one of the pair of multiport switches 301 is connectable to the first inputs (1) of the set of transfer switches 303, while the input port C of the other of the pair of multiport switches 303 is connectable to the second inputs (3) of the set of transfer switches 303. As a result, given the switching action of the transfer switches 303, a signal present at the input port C of one of the pair of multiport switches 301 can be distributed to any one of the eight output terminals (2 and 4) of the set of transfer switches 303. Likewise, a signal present at the input port C of the other of the pair of multiport switches 301 can also be distributed to any one of the eight output terminals (2 and 4) of the set of transfer switches 303.

The connections between the transfer stage and the output stage will now be described. Returning to FIG. 3, as previously mentioned, the 6-way multiport switches 302 of the output stage each utilize four input ports. These four input ports are connected to an output terminal of respectively different sets of transfer switches 303 of the transfer stage. For example, in the layout of FIG. 3, a topmost multiport switch 302 has a first input port connected to one of the output terminals of a first set of transfer switches 303, a second input port connected to one of the output terminals of a second set of transfer switches 303, a third input port connected to one of the output terminals of a third set of transfer switches 303, and a fourth input port connected to one of the output terminals of a fourth set of transfer switches 303. All of the remaining multiport switches 302 are similarly connected but to different output terminals among the output terminals of the transfer switches 303.

When viewed from the perspective of the transfer switches 303, it can be seen that the M outputs of each set of transfer switches 303 is connected to an input port of a respectively different one of the multiport switches 302. In other words, in the example of FIG. 3, each set of transfer switches 303 includes eight output terminals that are distributed to the eight multiport switches 302. As described previously, a signal present at the input port one of each pair of multiport switches 301 can be distributed to any one of the eight output terminals (2 and 4) of the set of transfer switches 303, and a signal present at the input port of the other of each pair of multiport switches 301 can also be distributed to any one of the eight output terminals (2 and 4) of the set of transfer switches 303. As such, by distribution of the eight output terminals of each set of transfer switches 303 to the eight multipoint switches 302, any signal present at any input port among the multiport switches 301 can be distributed to any output port among the multiport switches 302. In other words, the switch matrix is non-blocking.

Point-to-point connections 304 are provided between the output terminals of the transfer switches 303 and the input ports of the multiport switches 304. As mentioned previously, these connections may be physically implemented by coaxial cables.

In the example of FIG. 3 described above, an 8×8 non-blocking switch matrix is realized using 6-way multiport switches, rather than the lower performance 8-way multiport switches of the traditional technique. Further, as should be readily apparent, 4-way multiport switches can be used instead of the 6-way multiport switches of FIG. 3 since two of the ports of each switch are not used. The use of 4-way multiport switches may further improve system performance relative to the 8-way multiport switches of the traditional technique.

Further, and separately, the number of coaxial cables extending between chassis is reduced in the embodiment of FIG. 3. Assume that the dashed line 305 of FIG. 3 represents the demarcation boundary between two chassis housing the non-blocking switch matrix. It can be seen that four coaxial cable connections extend across the boundary from each of the four sets of transfer switches 303. As such, in the 8×8 non-blocking switch matrix of FIG. 3, a total of sixteen coaxial cables extend across the boundary from one chassis to another. This is in favorable contrast to the thirty-two coaxial cables that would extend across the chassis boundary in an 8×8 non-blocking switch matrix of the conventional technique.

Thus, the embodiment of FIG. 3 offers the dual benefits of allowing for an increase in input/output port dimensions of a non-blocking switch matrix without suffering the severe performance degradation that would result from the traditional technique, while also minimizing the number of cables extending from one chassis to another in the case where the switching matrix is equipped within in two or more chassis.

The 6-way multiport switches 301 and 302 of FIG. 3 may be implemented using the 87106 series of multiport coaxial switches manufactured by Keysight Technologies, although the embodiments are not limited to any particular devices or manufacturers. These multiport switches exhibit favorable isolation characteristics, typically greater than 90 dB at 26.5 GHz, and typically greater than 60 dB at 40 GHz. They are also featured by magnetic latching, and opto-electronic indicators and interrupts. The footprint is characterized by a two-and-a-half inch long rectangular body with a diameter of about two-and-a-quarter inches. Ribbon drive cabling may be used for control attachment.

Figure 5:
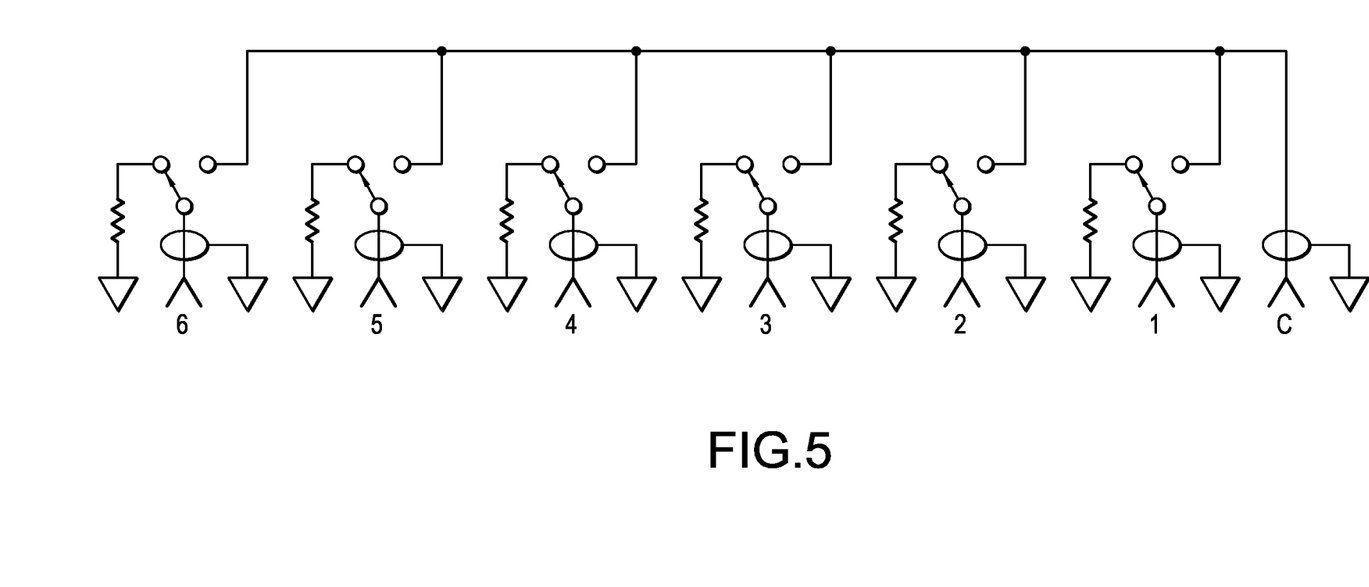
FIG. 5 is a simplified circuit diagram of a 6-way multiport switch.

FIG. 5 is a simplified schematic of an exemplary 6-way multiport switch 301 (or 302) of FIG. 3. As shown, the 6-way multiport switch 500 includes six inputs (or outputs) labelled 1 through 6, and a common input (or output) C. The illustrated switching mechanisms are responsive to control signals and operatively coupled between each of the inputs (or outputs) 1-6 and the common input (or output) C. In operation, any one of the inputs (or outputs) 1-6 may be coupled to the common input (or output) C. In the example shown in FIG. 5, the input (or output) 4 is connected to the common input (or output) C. The inputs (or outputs) 1-3 and 5-6 may be connected to a termination resistance. The termination resistance may, for example, be on the order of 50 ohms.

The transfer switches 303 of FIG. 3 may be implemented using the 87222 series of coaxial RF transfer switches manufactured by Keysight Technologies, although the embodiments are not limited to any particular devices or manufacturers. Operable up to 50 GHz, these switches exhibit exceptional isolation between ports. As non-limiting examples, the coaxial RF transfer switches may have an isolation that is typically 100 dB up to 20 GHz, and typically greater than 80 dB up to 40 GHz. They also include the features of opto-electronic indicators and interrupts. The footprint is characterized by a two-and-three-quarter inch long rectangular body with a diameter of about one-and-a-quarter inches. Ribbon drive cabling may be used for control attachment.

Figure 6:
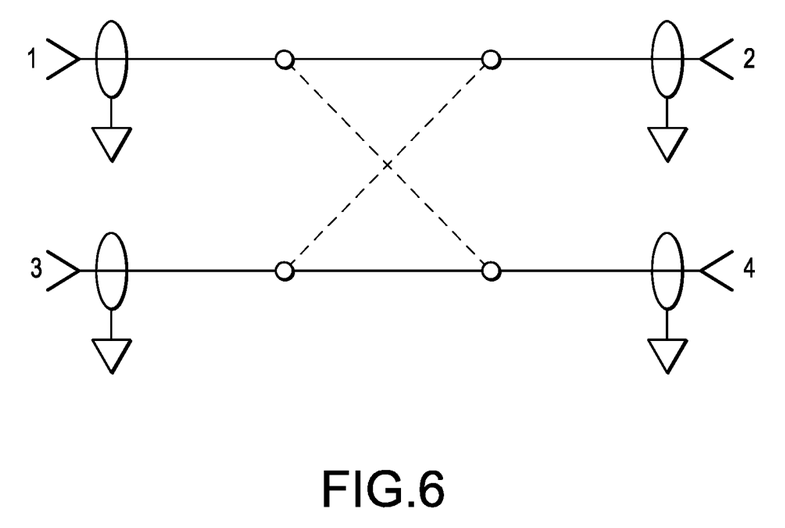
FIG. 6 is a simplified circuit diagram of a transfer switch.

FIG. 6 is a simplified schematic of an exemplary transfer switch 303 of FIG. 3. As shown, the transfer switch includes four ports 1 through 4. Basically, there are two positions for the transfer switch. One position has port 1 connected to port 2, and port 3 connected to port 4. The other position has port 2 connected to port 3, and port 1 connected to port 4. As such, when incorporated into the non-blocking switch matrix of FIG. 3, ports 1 and 3 of the transfer switch of FIG. 6 is utilized as inputs connected to the multiport switches 301 of the input stage, and port 2 and 4 of the transfer switch is utilized as outputs connected to the multiport switches 302 of the output stage.

Figure 7:
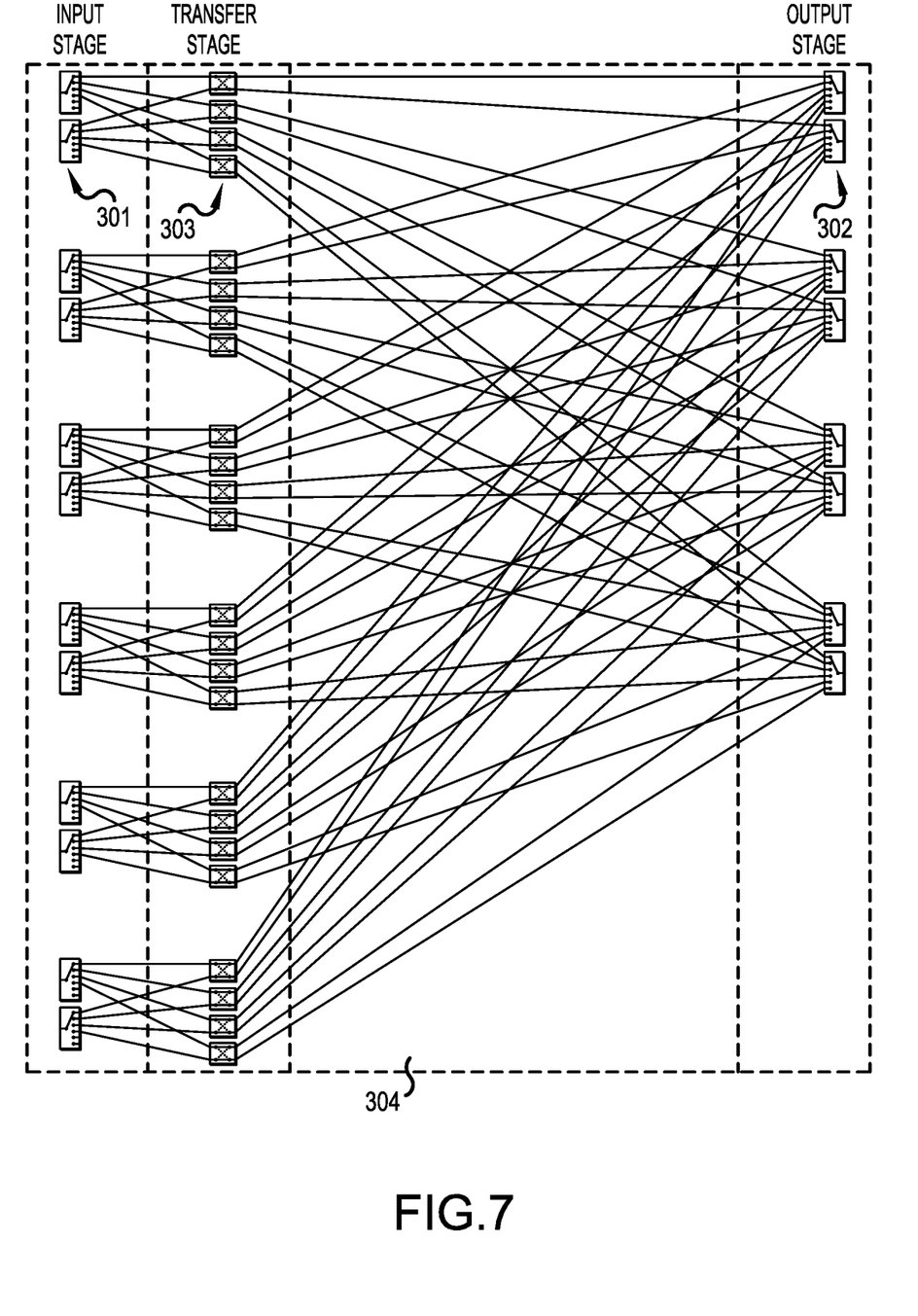
FIG. 7 is a schematic diagram of a non-blocking switch matrix according to another representative embodiment.

The example non-blocking switch matrix of FIG. 3 presented above is an 8×8 non-blocking switch matrix. However, the embodiments are not limited to those particular dimensions. FIG. 7 illustrates the example of a 12×8 non-blocking matrix.

Referring to FIG. 7, an input stage includes twelve input ports, each configured by a 6-way multiport switch 301. An output stage is made up of eight output ports, each also configured by a 6-way multiport switch 302. In this example, only four of the six ways of each multipoint switch 301 of the input stage are utilized, whereas all six ways of each multiport switch 302 of the output stage are utilized.

As with the previous embodiment of FIG. 3, the multipoint switches 301 of FIG. 7 are grouped in pairs for purposes of explanation. That is, in the case where there are N input ports, there are N/2 pairs of multiport switches in the input stage. As such, in the example of FIG. 7 having twelve input ports, there are six (12/2) pairs of the 6-way multipoint switches 301. In addition, there are N/2 sets of transfer switches 303 in the transfer stage corresponding to the N/2 pairs of multiport switches of the input stage. In other words, as described previously, for each pair of multipoint switches 301 there is a corresponding set of transfer switches 303. In the example of FIG. 7, there are six (12/2) sets of transfer switches 303 respectively corresponding to the six pairs of multiport switches 301.

Each set of transfer switches 303 includes M/2 transfer switches. As such, in the example of FIG. 7 having eight (M=8) output ports, each set of transfer switches 303 includes four (8/2) transfer switches 303.

The connection between one pair of multiport switches 301 of FIG. 7 to one set of transfer switches 303 is the same as that described previously in connection with FIG. 4. As a result, given the switching action of the transfer switches 303, a signal present at the input port of one of each pair of multiport switches 301 can be distributed to any one of the eight output terminals of corresponding set of transfer switches 303. Likewise, a signal present at the input port of each other of the pair of multiport switches 301 can also be distributed to any one of the eight output terminals of the corresponding set of transfer switches 303.

Returning again to FIG. 7, the 6-way multiport switches 302 of the output stage each utilize six input ports. These six input ports are connected to an output terminal of respectively different sets of transfer switches 303 of the transfer stage. For example, in the layout of FIG. 7, a topmost multiport switch 302 has a first input port connected to one of the output terminals of a first set of transfer switches 303, a second input port connected to one of the output terminals of a second set of transfer switches 303, a third input port connected to one of the output terminals of a third set of transfer switches 303, a fourth input port connected to one of the output terminals of a fourth set of transfer switches 303, a fifth input port connected to one of the output terminals of a fifth set of transfer switches 303, and a sixth input port connected to one of the output terminals of a sixth set of transfer switches 303. All of the remaining multiport switches 302 are similarly connected but to different output terminals among the output terminals of the transfer switches 303.

When viewed from the perspective of the transfer switches 303, it can be seen that the M outputs of each set of transfer switches 303 is connected to an input port of a respectively different one of the multiport switches 302. In other words, in the example of FIG. 7, each set of transfer switches 303 includes eight output terminals that are distributed to the eight multiport switches 302. As described previously, a signal present at the input port one of each pair of multiport switches 301 can be distributed to any one of the eight output terminals of the set of transfer switches 303, and a signal present at the input port of the other of each pair of multiport switches 301 can also be distributed to any one of the eight output terminals of the set of transfer switches 303. As such, by distribution of the eight output terminals of each set of transfer switches 303 to the eight multipoint switches 302, any signal present at any input port among the multiport switches 301 can be distributed to any output port among the multiport switches 302. In other words, the switch matrix is non-blocking.

Point-to-point connections 304 are provided between the output terminals of the transfer switches 303 and the input ports of the multiport switches 304. As mentioned previously, these connections may be physically implemented by coaxial cables. Coaxial cables may also be used to couple the multiport switches 301 of the input stages to the transfer switches 303 of the transfer stage.

In the example of FIG. 7 described above, a 12×8 non-blocking switch matrix is realized using 6-way multiport switches, rather than the lower performance 12-way and 8-way multiport switches of the traditional technique. Further, as should be readily apparent, 4-way multiport switches can be used instead of the 6-way multiport switches 301 of the input stage of FIG. 7 since two of the ports of each switch are not used. The use of 4-way multiport switches may further improve system performance relative to the 8-way and 12-way multiport switches of the traditional technique.

In the example embodiment of FIG. 7, forty-eight (48) coaxial cables may extend between the transfer stage and the output stage, half of which (24) would extend across the boundary from one chassis to the other in case where switch matrix is contained in two chassis. This is contrast to the conventional technique in which ninety-six (96) coaxial cables would extend between input multiport switches and output multiport switches, and half (48) of those would extend across the chassis boundary.

Figure 8A:
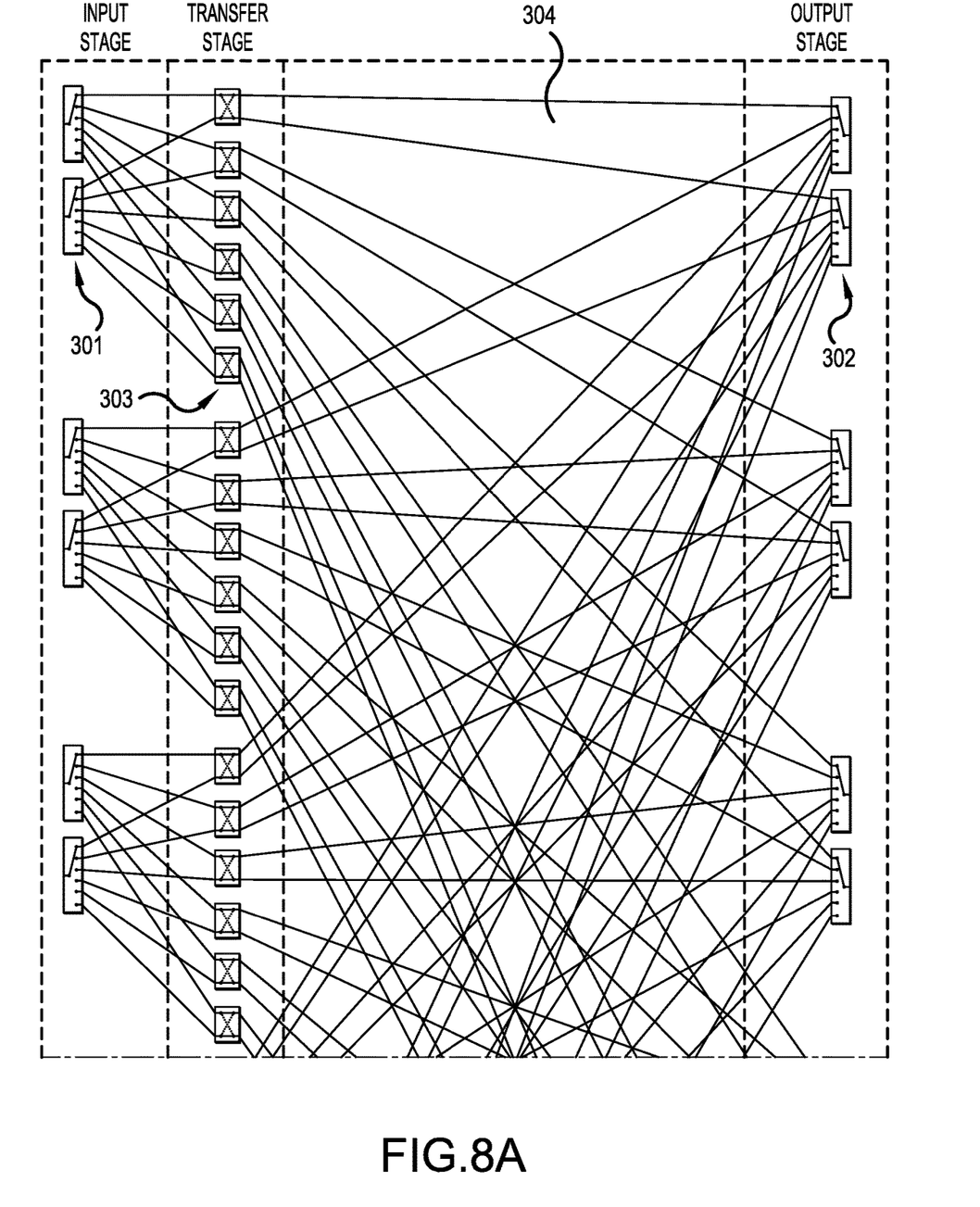
FIGS. 8A and 8B are diagrams of a non-blocking switch matrix according to another representative embodiment.
Figure 8B:
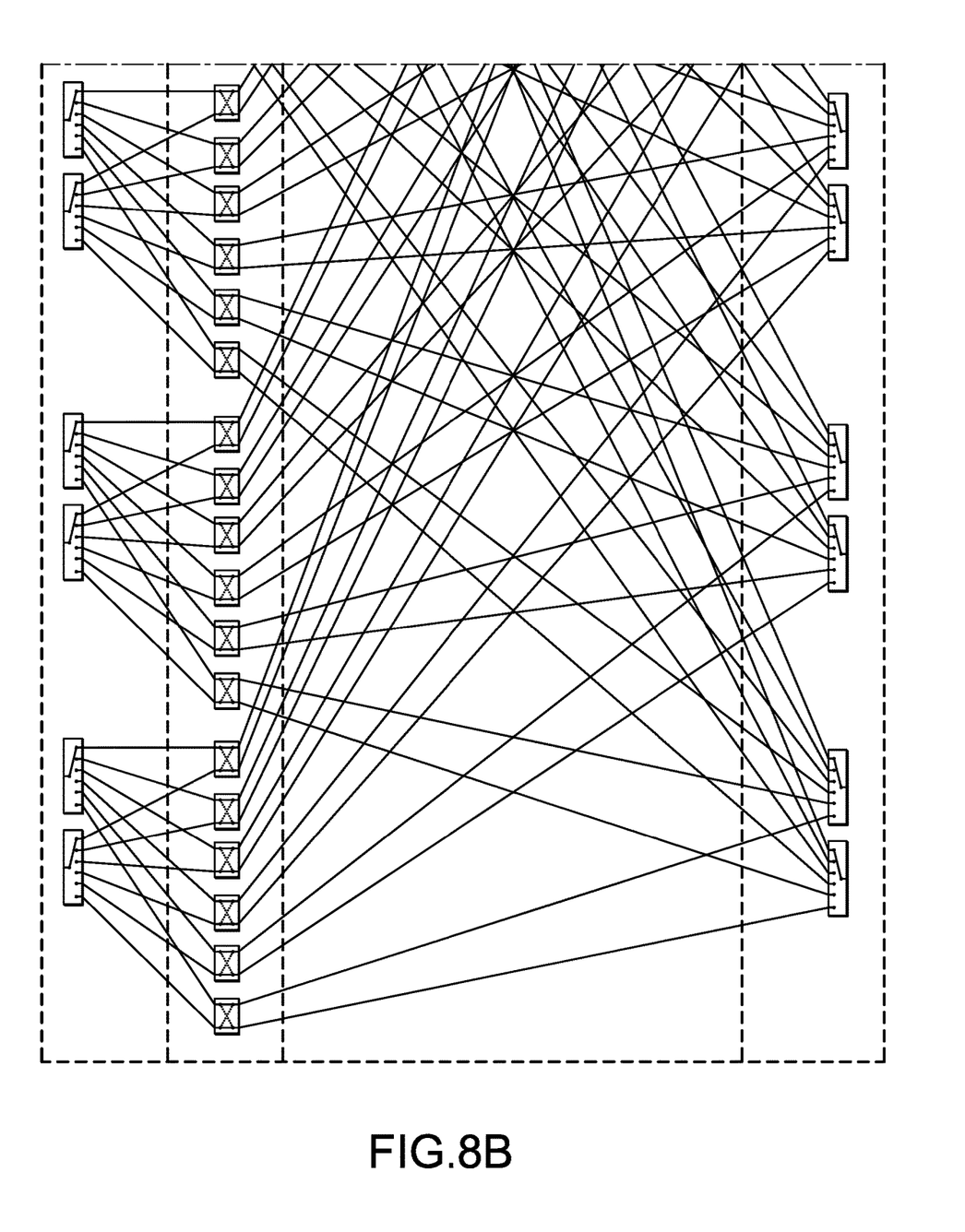

FIGS. 8A and 8B collectively illustrate an example of a 12×12 non-blocking matrix according to a representative embodiment. In particular, FIGS. 8A and 8B illustrate two portions of a schematic drawing of a 12×12 non-blocking matrix, where FIG. 8A depicts the top portion of the schematic drawing and FIG. 8B depicts the bottom portion of the schematic drawing.

Referring to FIGS. 8A and 8B collectively, an input stage includes twelve input ports, each configured by a 6-way multiport switch 301. An output stage is made also up of twelve output ports, each also configured by a 6-way multiport switch 302. In this example, all six of the ways of each multipoint switch 301 of the input stage are utilized, and all six of the ways each multiport switch 302 of the output stage are utilized.

As with the previous embodiment of FIG. 3, the multipoint switches 301 of FIGS. 8A and 8B are grouped in pairs for purposes of explanation. As before, in the case where there are N input ports, there are N/2 pairs of multiport switches in the input stage. As such, in the example of FIGS. 8A and 8B having twelve input ports, there are six (12/2) pairs of the 6-way multiport switches 301. In addition, as described previously, for each pair of multiport switches 301 there is a corresponding set of transfer switches 303. In the example of FIGS. 8A and 8B, there are six (12/2) sets of transfer switches 303 respectively corresponding to the six pairs of multiport switches 301.

Each set of transfer switches 303 includes M/2 transfer switches. As such, in the example of FIGS. 8A and 8B having twelve (M=12) output ports, each set of transfer switches 303 includes six (12/2) transfer switches 303.

The connection between one pair of multiport switches 301 of FIGS. 8A and 8B to one set of transfer switches 303 is the same as that described previously in connection with FIG. 4 except that all six ports of the 6-way multiport switches 301 are connected to respective inputs of six transfer switches 303 constituting a set of transfer switches 303. As a result, given the switching action of the transfer switches 303, a signal present at the input port of one of each pair of multiport switches 301 can be distributed to any one of the twelve output terminals of corresponding set of transfer switches 303. Likewise, a signal present at the input port of each other of the pair of multiport switches 301 can also be distributed to any one of the twelve output terminals of the corresponding set of transfer switches 303.

Returning again to FIGS. 8A and 8B, the 6-way multiport switches 302 of the output stage each utilize six input ports. These six input ports are connected to an output terminal of respectively different sets of transfer switches 303 of the transfer stage. For example, in the layout of FIGS. 8A and 8B, a topmost multiport switch 302 has a first input port connected to one of the output terminals of a first set of transfer switches 303, a second input port connected to one of the output terminals of a second set of transfer switches 303, a third input port connected to one of the output terminals of a third set of transfer switches 303, a fourth input port connected to one of the output terminals of a fourth set of transfer switches 303, a fifth input port connected to one of the output terminals of a fifth set of transfer switches 303, and a sixth input port connected to one of the output terminals of a sixth set of transfer switches 303. All of the remaining multiport switches 302 are similarly connected but to different output terminals among the output terminals of the transfer switches 303.

When viewed from the perspective of the transfer switches 303, it can be seen that the M outputs of each set of transfer switches 303 is connected to an input port of a respectively different one of the multiport switches 302. In other words, in the example of FIGS. 8A and 8B, each set of transfer switches 303 includes twelve output terminals that are distributed to the twelve multiport switches 302. As described previously, a signal present at the input port of one of each pair of multiport switches 301 can be distributed to any one of the twelve output terminals of the set of transfer switches 303, and a signal present at the input port of the other of each pair of multiport switches 301 can also be distributed to any one of the twelve output terminals of the set of transfer switches 303. As such, by distribution of the twelve output terminals of each set of transfer switches 303 to the twelve multipoint switches 302, any signal present at any input port among the multiport switches 301 can be distributed to any output port among the multiport switches 302. In other words, the switch matrix is non-blocking.

Point-to-point connections 304 are provided between the output terminals of the transfer switches 303 and the input ports of the multiport switches 304. As mentioned previously, these connections may be physically implemented by coaxial cables. Coaxial cables may also be used to couple the multiport switches 301 of the input stages to the transfer switches 303 of the transfer stage.

In the example of FIGS. 8A and 8B described above, a 12×12 non-blocking switch matrix is realized using 6-way multiport switches, rather than the lower performance 12-way multiport switches of the traditional technique.

Further, in the example embodiment of FIGS. 8A and 8B, seventy-two (72) coaxial cables may extend between the transfer stage and the output stage, half of which (36) would extend across the boundary from one chassis to the other in case where switch matrix is contained in two chassis. This is contrast to the conventional technique in which one-hundred-forty-four (144) coaxial cables would extend between input multiport switches and output multiport switches, and half (72) of those would extend across the chassis boundary.

While the disclosure references exemplary embodiments, it will be apparent to those skilled in the art that various changes and modifications may be made without departing from the spirit and scope of the present teachings. Therefore, it should be understood that the above embodiments are not limiting, but illustrative.

What is claimed is:

1. An N×M non-blocking switch matrix, where N and M are integers, comprising:
    an input stage comprising a plurality of m/2-way multiport switches, where quotient m/2 is a positive integer less than M, and each of the m/2 way multiport switches comprises an input port and m/2 output ports;
    an output stage comprising a plurality of n/2-way multiport switches, where quotient n/2 is a positive integer less than N, and each of the n/2 way multiport switches comprises an input port and m/2 output ports; and
    a transfer stage comprising plurality of transfer switches operatively connected between the input stage and output stage, and selectively applying outputs of the m/2-way multiport switches to inputs of the n/2-way multiport switches such that any given input to the m/2-way multiport switches is connectable to any given output of the n/2-way multiport switches.

2. The N×M non-blocking switch matrix of claim 1, where m=M and n=N.

3. The N×M non-blocking switch matrix of claim 1, wherein both of the quotients n/2 and m/2 are 6 or more.

4. The N×M non-blocking switch matrix of claim 3, wherein N and M are each 8 or more.

5. The N×M non-blocking switch matrix of claim 1, wherein at least one of N and M is 12 or more.

6. The N×M non-blocking switch matrix of claim 1, wherein each of the transfer switches comprises first and second input ports coupled to different ones of the m/2-way multiport switches, and first and second output ports coupled to different ones of the n/2-way multiport switches.

7. The N×M non-blocking switch matrix of claim 1, further comprising N×M/2 coaxial cables connecting the transfer stage to the output stage.

8. The N×M non-blocking switch matrix of claim 7, wherein half of the N×M/2 coaxial cables extend from one chassis to another chassis.

9. The N×M non-blocking switch matrix of claim 8, further comprising another N×M/2 coaxial cables connecting the input stage to the transfer stage.

10. An N×M non-blocking switch matrix, where N and M are integers, comprising:
    N/2 pairs of m/2-way multiport switches, where quotient m/2 is an integer greater than or equal to M/2 and less than M, each m/2-way multiport switch including an input port and m/2 output ports;
    N/2 sets of transfer switches operatively connected to the N/2 pairs of m/2-way multiport switches, respectively, each set of transfer switches including M/2 transfer switches, and each transfer switch including first and second input ports and first and second output ports, wherein the first input port of each transfer switch is connected to an output port of one m/2-way multiport switch among a respective pair of m/2-way multiport switches, and the second input port of each transfer switch is connected to an output port of another m/2-way multiport switch among the respective pair of m/2-way multiport switches; and
    M/2 pairs of n/2-way multiport switches, where quotient n/2 is an integer greater than or equal to N/2 and less than N, each n/2-way multiport switch including an output port and n/2 input ports, wherein the input ports of each n/2-way multiport switch are connected to an output port from among the respective N/2 sets of transfer switches.

11. The N×M non-blocking switch matrix of claim 10, where m=M and n=N.

12. The N×M non-blocking switch matrix of claim 10, where m/2>M/2 such that at least one of the m/2 output terminals of each m/2-way multiport switch is not used.

13. The N×M non-blocking switch matrix of claim 10, wherein each of the transfer switches comprises first and second input ports coupled to different ones of the m/2-way multiport switches, and first and second output ports coupled to different ones of the n/2-way multiport switches.

14. The N×M non-blocking switch matrix of claim 10, further comprising N×M/2 coaxial cables connected between the transfer switches and the n/2-way multiport switches.

15. An N×M non-blocking switch matrix, wherein N and M are positive integers of at least six, comprising:
    input multiport switches each having an input port and a number of output ports which is less than M;
    output multiport switches each having an output port and a number of input ports which is less than N; and
    a plurality of transfer switches operatively connected between the input multiport switches and the output multiport switches such that any given input port among the input multiport switches is connectable to any given output port among the output multiport switches.

16. The N×M non-blocking switch matrix of claim 15, wherein each transfer switch includes two input ports connectable to any of two output ports.

17. The N×M non-blocking switch matrix of claim 16, further comprising N×M/2 coaxial cables connecting the transfer stage to the output stage.

18. The N×M non-blocking switch matrix of claim 17, wherein half of the N×M/2 coaxial cables extend from one chassis to another chassis.

19. The N×M non-blocking switch matrix of claim 18, further comprising another N×M/2 coaxial cables connecting the input stage to the transfer stage.

20. The N×M non-blocking switch matrix of claim 15, where m=M and n=N.

* * * * *